US008655127B2

(12) United States Patent
Leonard et al.

(10) Patent No.: US 8,655,127 B2
(45) Date of Patent: Feb. 18, 2014

(54) RUGGED FIBER OPTIC CABLE

(75) Inventors: Teddy W. Leonard, Wirtz, VA (US);
Michael A. Stover, Roanoke, VA (US);
Aaron J. Plaski, Roanoke, VA (US)

(73) Assignee: Optical Cable Corporation, Roanoke, VA (US)

( * ) Notice: Subject to any disclaimer, the term of this patent is extended or adjusted under 35 U.S.C. 154(b) by 107 days.

(21) Appl. No.: 13/325,548

(22) Filed: Dec. 14, 2011

(65) Prior Publication Data
US 2012/0155814 A1 Jun. 21, 2012

Related U.S. Application Data

(60) Provisional application No. 61/424,275, filed on Dec. 17, 2010, provisional application No. 61/425,578, filed on Dec. 21, 2010.

(51) Int. Cl.
*G02B 6/44* (2006.01)

(52) U.S. Cl.
USPC .......................................... 385/106; 385/102

(58) Field of Classification Search
USPC .................................................. 385/102, 106
See application file for complete search history.

(56) References Cited

U.S. PATENT DOCUMENTS

| 4,723,831 | A | 2/1988 | Johnson et al. |
| 4,976,519 | A | 12/1990 | Davey et al. |
| 5,193,134 | A | 3/1993 | Pizzorno et al. |
| 5,390,273 | A * | 2/1995 | Rahman et al. ............... 385/112 |
| 6,108,473 | A * | 8/2000 | Beland et al. ................ 385/113 |
| 6,233,384 | B1 * | 5/2001 | Sowell et al. ................ 385/107 |
| 6,278,825 | B1 * | 8/2001 | Casiraghi et al. ............ 385/100 |
| 6,430,344 | B1 | 8/2002 | Dixon et al. |
| 6,711,329 | B2 * | 3/2004 | Zelesnik ...................... 385/100 |
| 6,744,955 | B2 | 6/2004 | Nechitailo et al. |
| 6,931,184 | B2 | 8/2005 | Tedder et al. |
| 6,993,227 | B2 | 1/2006 | Lee et al. |
| 7,016,578 | B2 | 3/2006 | Lee et al. |
| 7,194,168 | B2 | 3/2007 | Rosenquist |
| 7,403,687 | B2 | 7/2008 | Smith |
| 7,522,795 | B2 | 4/2009 | Nothofer et al. |
| 7,609,926 | B2 | 10/2009 | Rosenquist et al. |
| 7,720,338 | B2 | 5/2010 | Graveston et al. |
| 7,742,668 | B2 | 6/2010 | Nothofer et al. |

(Continued)

FOREIGN PATENT DOCUMENTS

| EP | 1026700 A2 | 8/2000 |
| EP | 1369724 A2 | 12/2003 |

OTHER PUBLICATIONS

PCT Partial International Search Report, Apr. 18, 2012, International Application No. PCT/US2011/065435.

(Continued)

*Primary Examiner* — Omar Rojas
(74) *Attorney, Agent, or Firm* — The Van Winkle Law Firm; David M. Carter

(57) ABSTRACT

There is provided an optical fiber cable having a plurality of optical fiber members. Each optical fiber member includes an optical fiber and a protective coating surrounding the optical fiber. A polymer coating surrounds the plurality of optical fiber members and a portion of the polymer coating is located between at least some of the optical fiber members. The optical fiber members and the polymer coating form an optical fiber unit. A tight buffer surrounds the optical fiber unit.

22 Claims, 9 Drawing Sheets

(56) References Cited

U.S. PATENT DOCUMENTS

| | | |
|---|---|---|
| 2008/0285924 A1 | 11/2008 | Graveston et al. |
| 2009/0087154 A1 | 4/2009 | Bradley et al. |
| 2010/0158457 A1 | 6/2010 | Drozd et al. |
| 2011/0243515 A1 | 10/2011 | Bradley et al. |

OTHER PUBLICATIONS

International Search Report and Written Opinion of the International Search Authority; PCT Patent Application PCT/US2011/065435; Sep. 14, 2012.

\* cited by examiner

# RUGGED FIBER OPTIC CABLE

RELATIONSHIP TO PRIOR APPLICATION

This is a U.S. non-provisional application relating to and claiming the benefit of U.S. Provisional Patent Application Ser. No. 61/424,275 filed Dec. 17, 2010 and U.S. Provisional Patent Application Ser. No. 61/425,578 filed Dec. 21, 2010.

BACKGROUND OF THE INVENTION

Fiber optic cables are widely used in the communications industry. For indoor and outdoor applications these cables are generally provided in loose tube and tight buffer cable construction types. Loose tube cables contain one or more optical fibers within one or more loose tubes. Excess fiber length is provided within the loose tube allowing fiber movement during flexure and tensile loading. In tight buffer cables, each individual optical fiber is contained under a thermoplastic sheath applied directly to the fiber protective coating. This thermoplastic tight buffer sheath provides added protection for each fiber for crush and impact forces during handling and installation.

In addition to increased protection for crush and impact forces, tight buffer cables provide protection from moisture exposure when constructed from suitable outdoor rated materials. However, these cables contain more material than loose tubes because each fiber has an individual buffer. This additional material causes the cables to have large diameters, particularly for high fiber counts, resulting in lower fiber density and higher costs.

Loose tube cables provide high density of fibers in a compact construction, especially if the fibers are contained in ribbons. However, loose tubes have low inherent resistance to crush or impact forces and moisture exposure, so the cable must be rated for low exposure levels or protections must be provided elsewhere in the cable design. Also, fiber ribbons have a preferential bend axis which may limit the ability of the cable to perform in sharp bends without twisting.

If multiple fibers are provided in a small loose tube fiber unit design, an even more compact and higher density cable can be constructed. However, these fiber unit loose tube cables are not well suited for indoor and outdoor applications and are not designed for direct termination to multi-fiber connectors.

SUMMARY OF THE INVENTION

In accordance with one form of this invention, there is provided an optical fiber cable having a plurality of optical fiber members. Each optical fiber member includes an optical fiber and a protective coating surrounding the optical fiber. A polymer coating surrounds the plurality of optical fiber members wherein a portion of the polymer coating is located between at least some of the adjacent optical fiber members. The optical fiber members and the polymer coating form a fiber unit. A tight buffer surrounds the fiber unit. Preferably, the polymer coating is a single layer of an acrylate.

In accordance with another form of this invention, there is provided an optical fiber cable having a plurality of optical fiber members. Each optical fiber member includes an optical fiber and a protective coating surrounding the of optical fiber. A polymer coating surrounds the plurality of optical fiber members forming at least one fiber unit. A thermoplastic layer surrounds the optical fiber unit. The thermoplastic layer is in intimate contact with the polymer coating of the optical fiber unit thereby forming a tight buffer. Preferably, the tight buffer is formed by extruding thermoplastic material directly onto the fiber unit.

In one embodiment of the invention, the optical fiber cable includes a plurality of tight buffered optical fiber units.

In one embodiment, the optical fiber unit includes an aramid yarn located on the outer surface of the polymer coating which surrounds the plurality of optical fiber members. Preferably, an outer jacket is received over the tight buffered fiber unit or units.

In one embodiment, an aramid layer is formed between the outer jacket and the tight buffered fiber unit or units.

In one embodiment, there is provided a rugged fiber optic cable, which preferably is miniature, having one or more optical fiber units each containing a plurality of optical fiber members and positioned under a tight thermoplastic sheath or buffer applied directly over each optical fiber unit. Preferably, each optical fiber unit outer coating is formed using a UV cured polymer such as acrylate. The fiber optic cable may be constructed in a form suitable for installation and operation in either or both indoor and outdoor applications. Water blocking elements such as super absorbent polymer coated yarn, tapes or powders may be added for some applications.

In one embodiment, there is provided a rugged fiber optic cable, which preferably is miniature, having one or more optical fiber units each containing a plurality of optical fiber members and positioned with a strength member layer, such as aramid yarn, applied between the optical fiber unit and a tight thermoplastic sheath or buffer.

In one embodiment, there is provided a rodent deterrent fiber optic cable having one or more optical fiber units each containing a plurality of optical fiber members and constructed such that a layer of aramid yarn with optional water blocking properties is applied over the tight buffered optical fiber unit and an inner polymeric jacket is applied over the aramid yarn layer. A rodent deterrent layer, such as steel wire braid or polyester or steel tape for protection against rodents and gnawing animals, is applied over the inner polymeric jacket with an outer polymeric jacket layer applied over the steel wire layer.

As used herein "optical fiber member" means an optical fiber coated with a protective coating and "optical fiber unit" means a plurality of fiber members surrounded by a polymer coating or layer which may bind the fiber members together forming a unit. When an optical fiber unit is constructed in accordance with the teachings of this invention wherein the optical fiber unit polymer coating is in a tight or semi-tight relation with the optical fiber members and a thermoplastic tight buffer is applied directly over the optical fiber unit outer coating, a rugged outdoor rated cable can be constructed which has both high fiber density and high resistance to crush, impact, and moisture exposure. In addition, when flame retardant outdoor rated materials are used, this cable with tight buffer optical fiber unit or units can also be made suitable for both indoor and outdoor applications. For ease of stripping and termination, a release agent may be applied to both the optical fiber members within the optical fiber unit and also between the thermoplastic tight buffer and the fiber unit. Another embodiment allowing direct termination to multi-fiber connectors includes a strength member such as aramid yarn between the optical fiber unit outer coating and the thermoplastic tight buffer. This yarn may contain water blocking elements such as super absorbent polymer coatings or powders for an outdoor or indoor-outdoor design.

DESCRIPTION OF THE PREFERRED EMBODIMENTS

Figure 1:
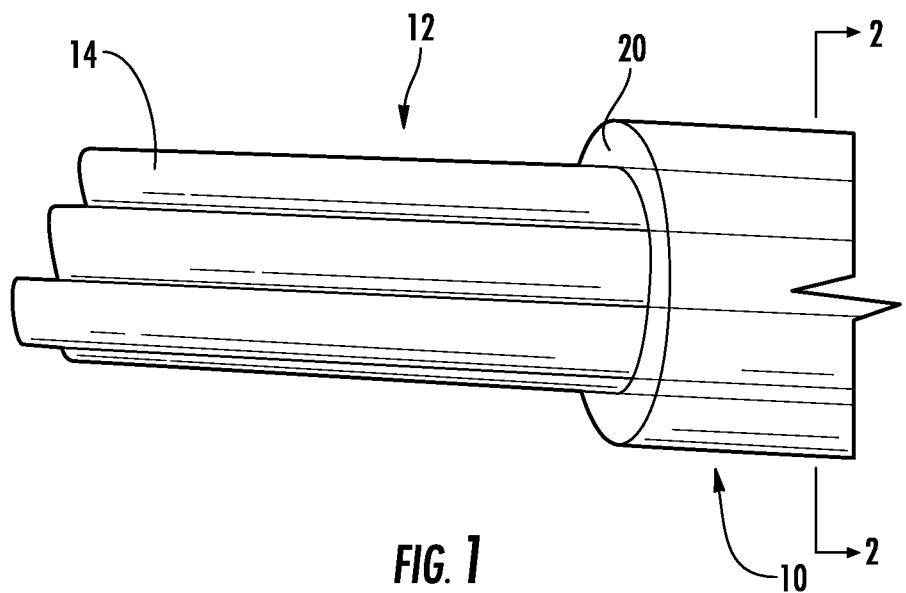
FIG. 1 is a side elevational view of an optical fiber unit with optical fiber members extending therefrom before a tight buffer is applied to the fiber unit.

Referring now more particularly to FIGS. 1-7, there is provided optical fiber unit 10 including a plurality 12 of closely spaced optical fiber members 14 surrounded by coating 20. Each optical fiber member 14 includes optical fiber or filament 16 coated with a protective coating 18. Each optical fiber 16 may be single mode or multi-mode and are preferably bend insensitive fibers as known to those skilled in the art. In the embodiment of FIGS. 3-7, there are twelve individual optical fiber members 14. Each optical fiber member includes a fiber or filament 16, which is preferably made of glass and which is capable of transmitting light. Each optical fiber 16 includes a core surrounded by a cladding as is known to those skilled in the art. Preferably, the optical fibers 16 are approximately 125 microns in diameter, but may be smaller or larger. The protective coating 18 of each optical fiber 16, preferably is made of acrylate. Preferably, each coating is a different color so that the individual optical fiber members in the cable may be readily differentiated. Preferably each acrylate coated fiber member 14 is approximately 250 microns in diameter, but may be smaller, such as 200 microns in diameter, or larger, such as 500 microns in diameter. Also, preferably, the protective coating 18 is approximately 62.5 microns thick, but it may be thinner or thicker.

Figure 2:
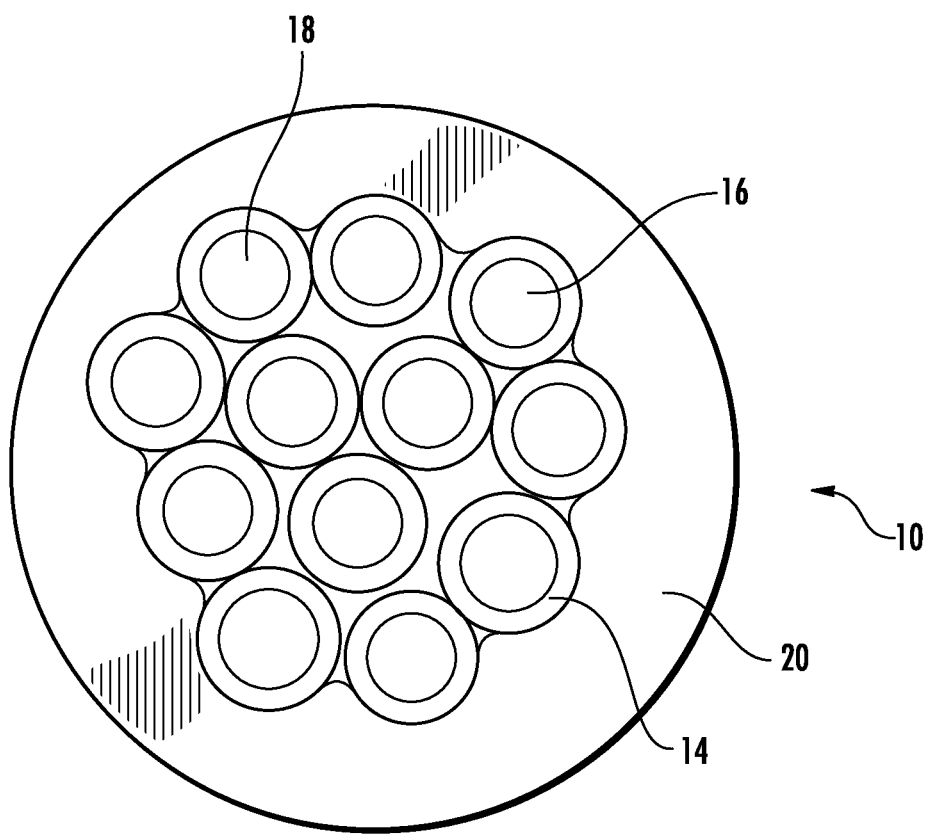
FIG. 2 is a cross-sectional view of the optical fiber unit of FIG. 1 taken through section line 2-2.
Figure 3:
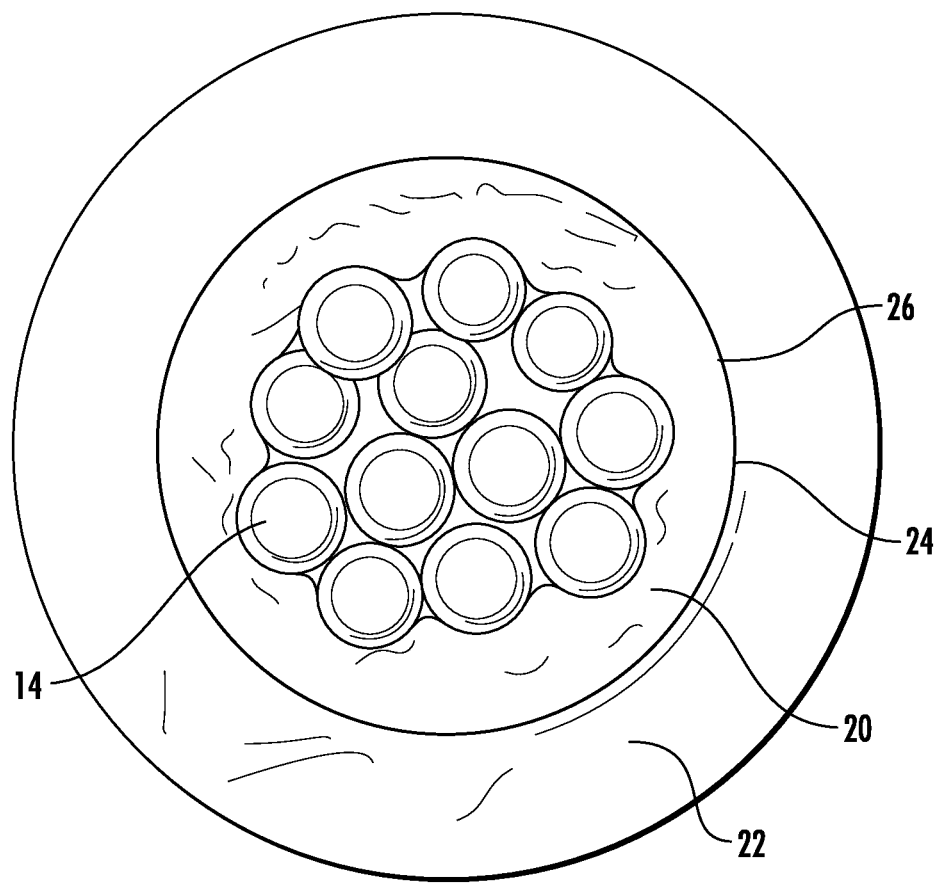
FIG. 3 is cross-sectional view of the optical fiber unit of FIGS. 1 and 2 with a tight buffer layer applied thereto taken through section line 3-3 of FIG. 4 in accordance with the teachings of this invention.
Figure 4:
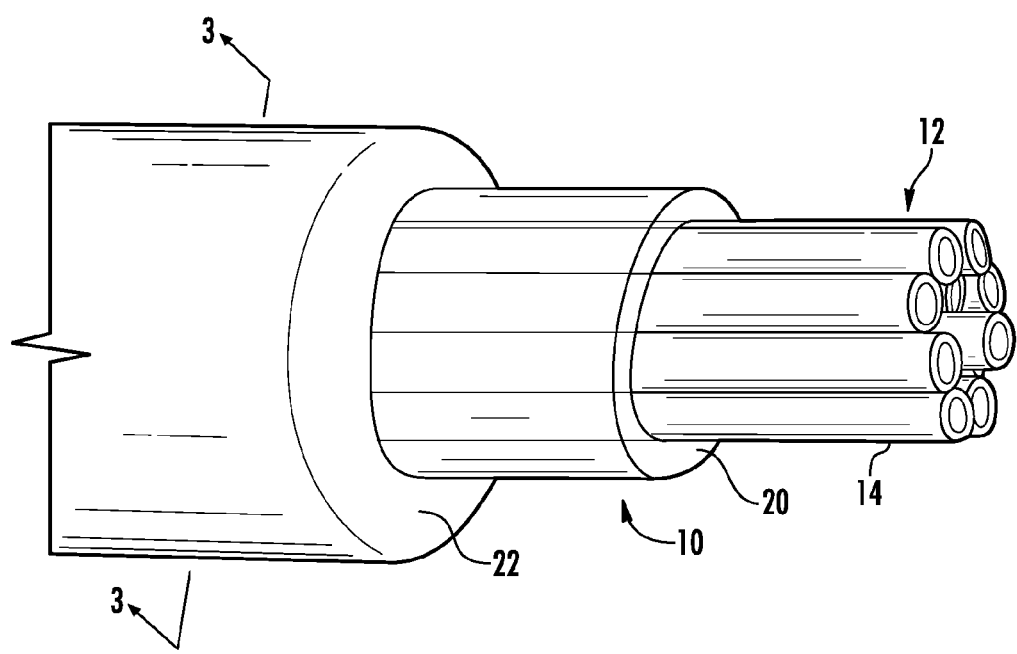
FIG. 4 is an isometric view of a tight buffered optical fiber unit showing a tight buffer layer applied thereto in accordance with the teachings of this invention.
Figure 5:
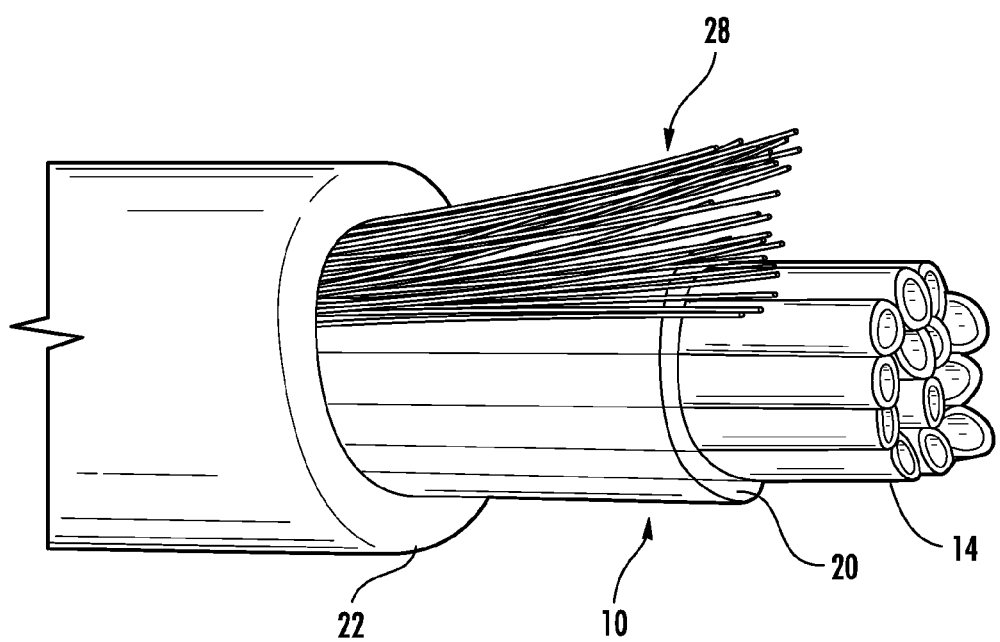
FIG. 5 is an isometric view of a tight buffered optical fiber unit showing another embodiment of this invention whereby an aramid yarn layer is superimposed between the optical fiber unit outer coating and the tight buffer layer.
Figure 6:
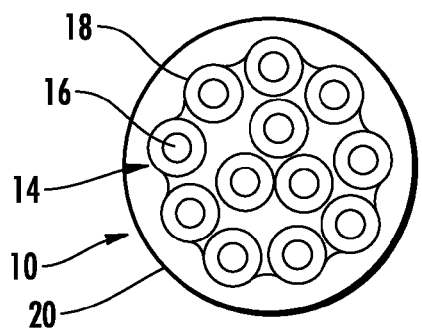
FIG. 6 is another sectional view of an optical fiber unit prior to the application of a tight buffer layer.

As best illustrated in FIG. 2, each optical fiber member 14 is in close proximity to adjacent optical fiber members forming a tight bundle for the plurality of fibers 12. A polymer coating 20, which preferably is a single layer of acrylate, surrounds the entire plurality or bundle 12 of optical fiber members 14 and forms the optical fiber unit outer coating. Preferably, outer coating 20 penetrates between some of the adjacent optical fiber members 14. Preferably, this acrylate coating is UV cured. This optical fiber unit outer coating 20, in combination with the plurality of optical fiber members 14, all of which are in close proximity to one another, forms fiber unit 10. The polymer coating 20 binds the optical fiber members 14 together into a cohesive structure. In particular for outdoor use, an amount of water blocking material such as gel or powder may be inserted within the interstices of the plurality of optical fibers 12 to prevent moisture from entering the cable. The preferred water blocking material is a non-hygroscopic thixotropic filling compound which has the added benefit of ease of stripability for the cable. Alternatively, the water blocking material may be a water swellable material such as a thread or powder containing a superabsorbent fiber. Since the individual optical fiber members 14 do not each have an outer buffer, a very small diameter or "miniature" cable may be constructed using the teachings of this invention.

A thermoplastic sheath 22 is applied directly over optical fiber unit outer coating 20, preferably by extrusion, so that there is substantially no space between the inside wall 24 of thermoplastic sheath 22 and the outside surface 26 of fiber unit 10. Thermoplastic sheath 22 is thus in intimate contact with outer coating 20 and therefore a tight buffer layer if formed. The thermoplastic sheath 22 may be made of various materials such as PVC or a hard elastomeric material or plastic mixtures. One preferred thermoplastic material for sheath 22, particularly for outdoor applications, is a thermoplastic polyester elastomer such as Hytrel, which is commercially available from DuPont Company. These thermoplastic elastomers are hard and perform well over a wide range of temperatures which are qualities particularly needed for outdoor applications. Other thermoplastic materials for indoor and outdoor applications may also be used, such as a thermoplastic elastomer comprising a mixture of polyethylene ("PE") and ethylene propylene diene monomer ("EPDM"). A suitable PE/EPDM mixture is Telcar thermoplastic elastomer commercially available from Teknor Apex Company. A PE/EPDM mixture provides good bend flexibility and is flame retardant.

By using a mixture of PE and EPDM as the material for the tight buffer over the fiber unit and a non-hygroscopic thixotropic filling compound within the fiber unit, a rugged optical fiber cable may be constructed for both indoor and outdoor applications since the PE/EPDM buffer is flame retardant, which is needed for indoor applications, the non-hygroscopic thixotropic filling compound blocks water, which is needed for outdoor applications, and the PE/EPDM buffer is sufficiently tough and hard and adequately performs over a wide range of temperatures for outdoor applications. Thus, both indoor and outdoor cables may be manufactured on the same line without the need to change set up.

Tight buffer layer 22 protects the optical fiber members 14 from crushing, from mechanical shock, and from environmental exposure. Tight buffer layer 22 also eliminates the need for buffers on individual optical fiber members so that the diameter of the cable may be reduced. Preferably, the thickness of the wall of tight buffer layer is between 0.225 mm and 0.425 mm, and more preferably, the thickness is 0.325 mm.

Figure 7:
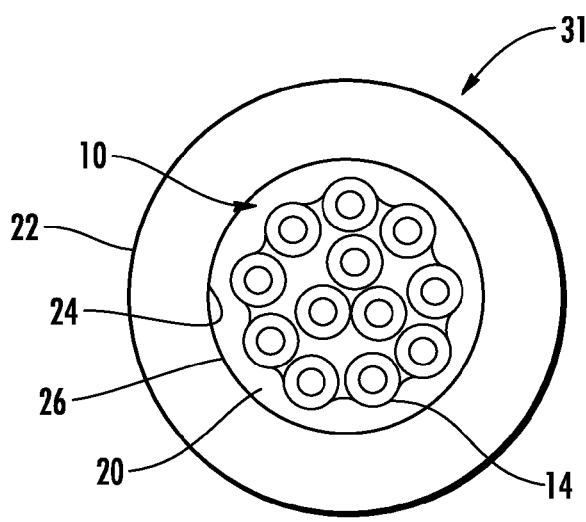
FIG. 7 is a sectional view of a tight buffered optical fiber unit in accordance with one embodiment of the invention.

Optical fiber unit 10 is compactly constructed as shown in FIGS. 1-7, and the thermoplastic tight buffer layer 22, as shown in FIG. 7, is in intimate contact with optical fiber unit outer coating 20. This tight buffered optical fiber unit approach enables the construction of a rugged outdoor rated cable, such as cable 30 shown in FIG. 9 having a plurality of tight buffered optical fiber units 31, which has both high fiber density and high resistance to crush, impact and moisture exposure. In addition, when flame retardant outdoor rated materials are used this cable with one or more tight buffered optical fiber units can also be made suitable for both indoor and outdoor applications. For ease of stripping and termination, a release agent or a gel may be applied to both the fibers within the fiber unit 10 and also between the thermoplastic buffer and the fiber unit 10.

Figure 8:
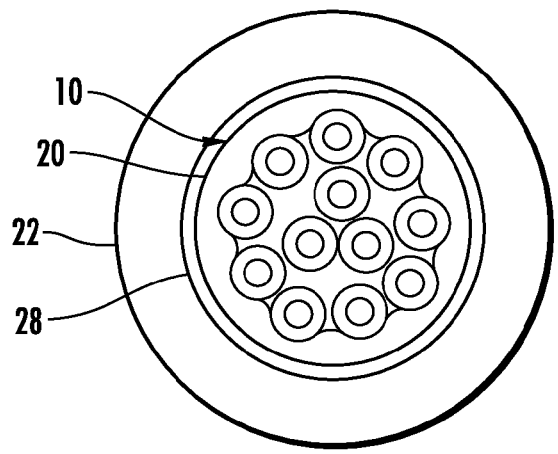
FIG. 8 is a sectional view of a tight buffered optical fiber unit in accordance with the embodiment of FIG. 5 whereby an aramid yarn layer is superimposed between the optical fiber unit and the tight buffer layer.

Referring now more particularly to FIG. 8, which is similar to the embodiment of FIG. 7, a layer of aramid yarn 28 is snugly placed between fiber unit outer coating 20 and tight buffer layer 22. In some embodiments, the aramid layer may form part of the fiber unit 10. Aramid yarn 28 serves as a strength member. The aramid yarn may also contain water blocking elements such as super-absorbent polymer coatings or powders for an indoor or outdoor design. The aramid yarn 28 also forms a strength member to tie off to a multi-fiber connector, so that the glass fibers 12 are not subjected to pulling loads. Without yarn 28, the end of the buffered fiber optic units 31 may need to be inserted into an external tube containing yarn to provide tensile load or be terminated inside a protective housing such as a patch panel or splice tray. In the embodiment of FIG. 8, a thermoplastic material, such as PVC or hard elastomeric compound, is extruded directly onto aramid yarn layer 28 forming a tight buffer. In some embodiments where aramid yarn 28 is used, the extruded thermoplastic material is also in intimate contact with the polymer which forms part of the optical fiber unit.

Figure 9:
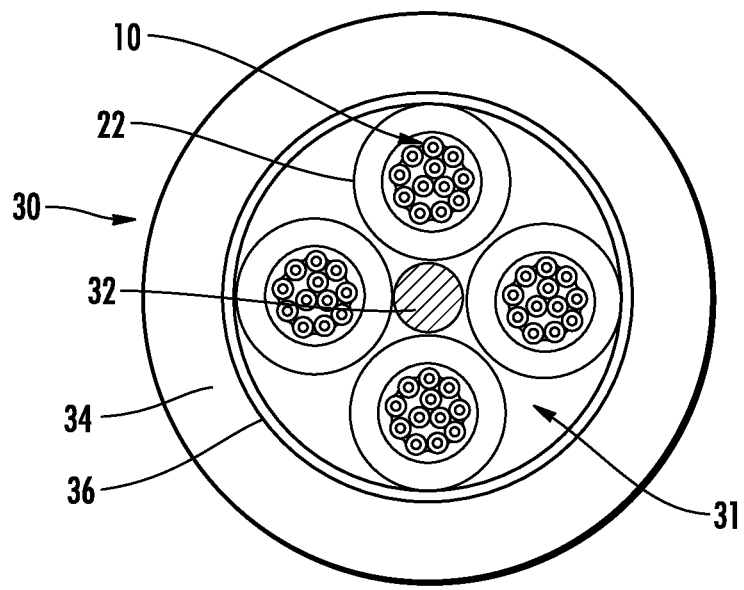
FIG. 9 is a sectional view of a cable showing another embodiment of the invention whereby four optical fiber units having tight buffers are contained within an outer jacket.

Referring now more particularly to FIG. 9, there is provided fiber optic cable 30 containing four tight buffered fiber optic units 31 as shown in FIG. 7. Each optical fiber unit 10 includes tight buffer layer 22 forming tight buffered optical fiber unit 31. E-glass rod or other central strength member 32 is received in the center of cable 30 and adjacent to each of the four tight buffered fiber optic units 31. Cable 30 includes outer jacket 34. Aramid yarn 36 is located adjacent to the inside surface of outer jacket 34 and may fill some of the interstitial space between the tight buffered optical fiber units 31. Aramid yarn 36 may have a super absorbent polymer coating for water blocking, or other water blocking tapes or powder may be used for some applications.

Figure 10:
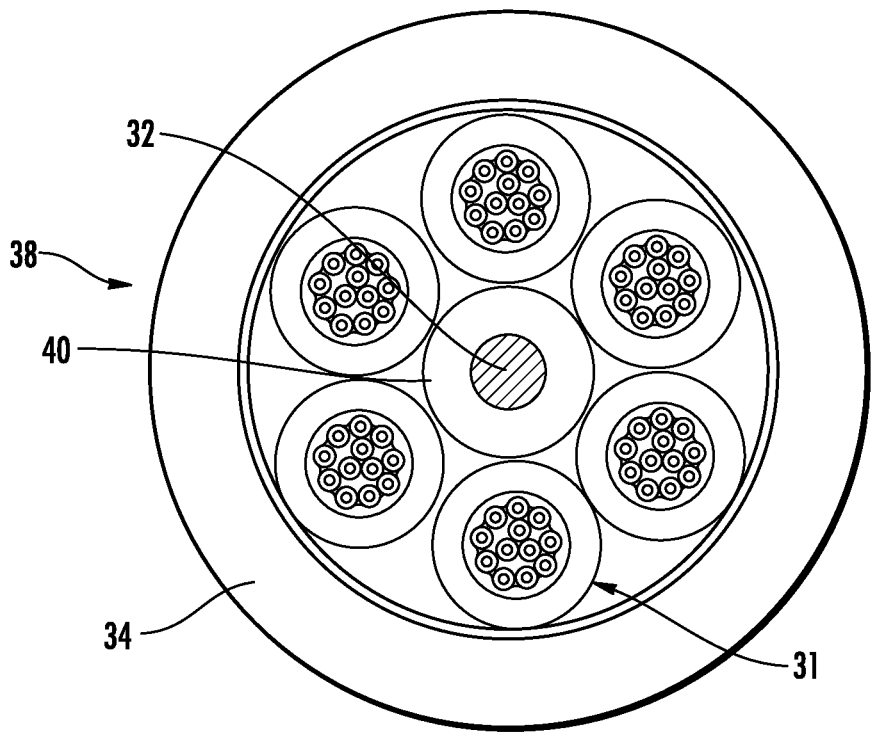
FIG. 10 is a sectional view of a cable showing another embodiment of the invention whereby six optical fiber units having tight buffers are contained within an outer jacket.

Referring now more particularly to FIG. 10, there is provided fiber optic cable 38 which is similar in construction to fiber optic cable 30 shown in FIG. 9, except that six tight buffered optical fiber units 31 are contained within the cable jacket 34. In addition, the e-glass rod 32 or other central strength member is encapsulated by a thermoplastic buffer 40. Aramid yarn may also be applied over buffer 40.

Figure 11:
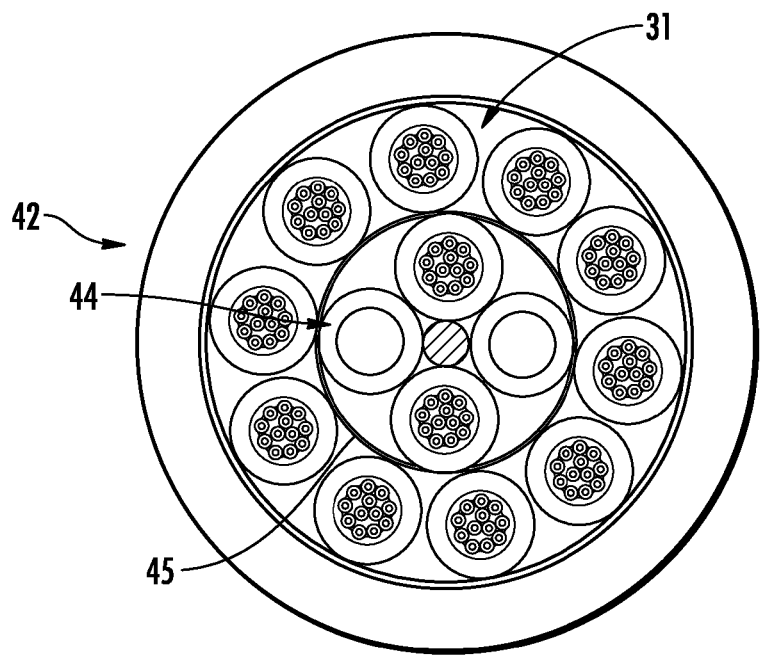
FIG. 11 is a sectional view of a cable showing another embodiment of the invention whereby twelve optical fiber units having tight buffers are contained within an outer jacket.

Referring now more particularly to FIG. 11, fiber optic cable 42 is provided and it is similar to fiber optic cable 30 shown in FIG. 9, except that twelve tight buffered optical fiber units 31 having tight buffers are received within a cable jacket. In addition, two filler units 44 are provided adjacent to the fiber optic units. An inner layer 45 of aramid yarn may also be provided.

Figure 12:
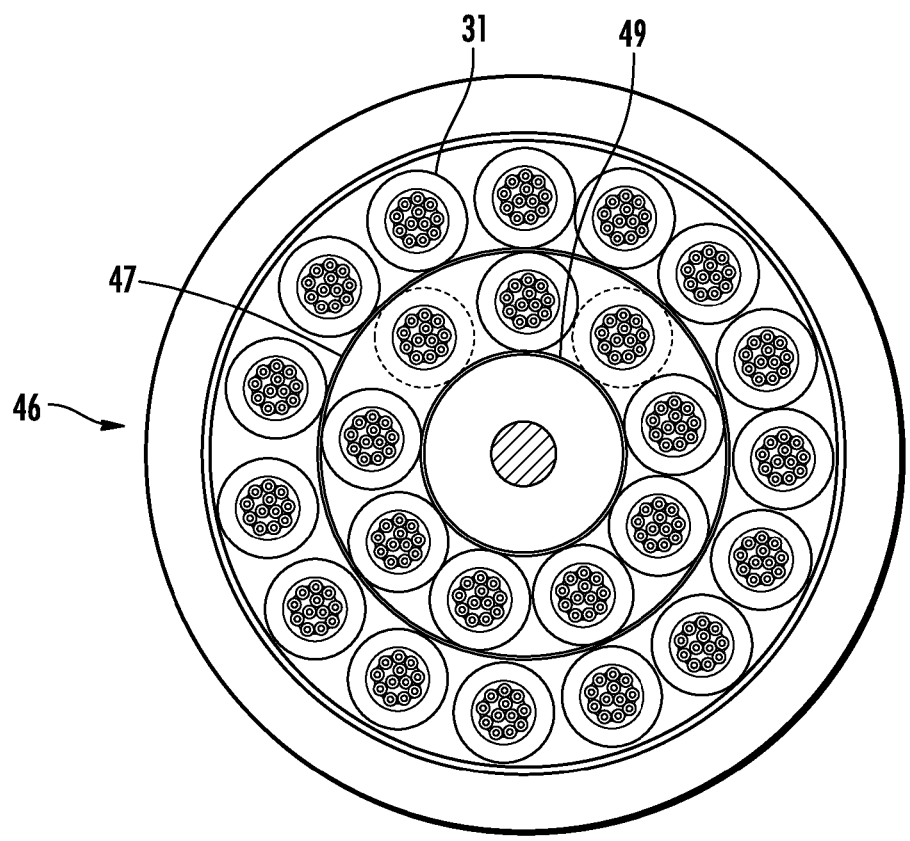
FIG. 12 is a sectional view of a cable showing another embodiment of the invention whereby twenty-four optical fiber units having tight buffers are contained within an outer jacket.

Referring now more particularly to FIG. 12, there is provided fiber optic cable 46 which is also similar to fiber optic cable 30 shown in FIG. 10, except that twenty-four fiber optic units are received within the cable jacket. Two inner layers 47 and 49 of aramid yarn are also provided.

Figure 13:
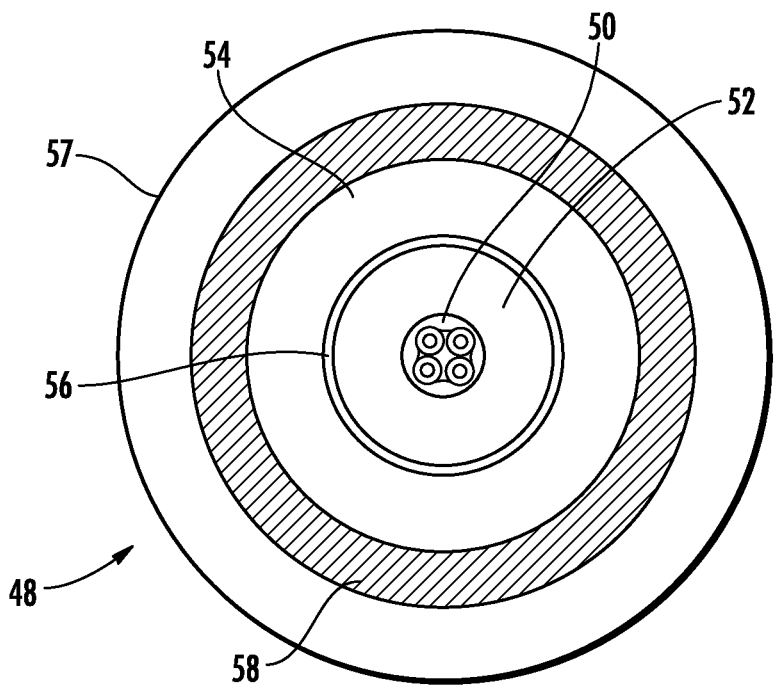
FIG. 13 is a sectional view of a cable showing another embodiment of the invention whereby one optical fiber unit with four optical fiber members having a tight buffer layer is surrounded by aramid yarn strength members with an inner polymer jacket applied over the aramid yarn, a steel wire layer applied over the polymer jacket, and an outer polymer layer applied over the steel wire layer.

Referring now more particularly to FIG. 13, there is provided fiber optic cable 48 having optical fiber unit 50 which includes four optical fiber members having an optical fiber unit outer coating, preferably made of acrylate surrounded by tight buffer 52. Inner jacket 54, which is preferably a thermoplastic material such as polyurethane, is provided and an aramid yarn layer 56 is interposed between tight buffer 52 and inner jacket 54. Outer jacket 57, which is preferably made of a thermoplastic material such as polyurethane or polyethylene, is provided. A rodent deterrent layer 58, such as a braid, which is preferably made of steel, is interposed between inner jacket 54 and outer jacket 57. Braid 58 protects the cable against rodents and gnawing animals. Braid 58 could be made of other materials, such as bronze. The rodent deterrent layer 58 could be made of other non-braided materials, such as fiberglass yarn or steel tape.

Figure 14:
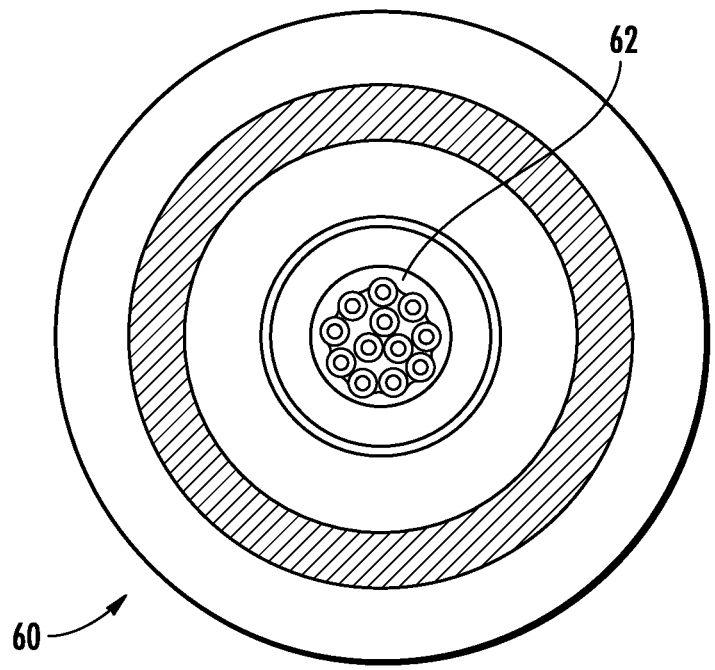
FIG. 14 is a sectional view of a cable showing an alternate embodiment of the embodiment of FIG. 13 whereby the optical fiber unit having a tight buffer layer contains twelve optical fiber members.

Referring now more particularly to FIG. 14, there is provided fiber optic cable 60 which is identical the fiber optic cable 48 shown in FIG. 13 except that optical fiber unit 62 includes twelve optical fibers.

There can also be four and twelve fiber tight buffered unarmored cables which could be identical to cables 48 and 60 shown in FIGS. 13 and 14, except that outer jacket 57 and braid 58 would be removed. These unarmored low count fiber versions are small and light weight and are easy to deploy.

The invention described herein provides for cables which have the benefits of fiber protection enabled by individual fiber unit tight buffering, yet have the high fiber density normally found in a loose tube construction. The invention provides for a rugged design which enables both indoor and outdoor design options and provides cables which have very small diameters yet the fibers are well protected from damage. In addition, by including the aramid yarn layer between the tight buffer layer and the fiber unit outer coating, one can readily terminate the cable to multi-fiber connectors such as MPO connectors.

From the foregoing description of the embodiments of the invention, it will be apparent that many modifications may be made therein. It will be understood that these embodiments of the invention are exemplifications of the invention only and that the invention is not limited thereto.

The invention claimed is:

1. An optical fiber cable comprising:
   a plurality of optical fiber members; each optical fiber member including an optical fiber and a protective coating surrounding the optical fiber;
   a polymer coating surrounding the plurality of optical fiber members wherein a portion of the polymer coating is located between at least some of the optical fiber members;
   the optical fiber members and the polymer coating forming an optical fiber unit; and
   a tight buffer surrounding the optical fiber unit; the tight buffer having an inner wall and an outer wall; the polymer coating having an outer surface; the tight buffer being extruded directly onto the outer surface of the polymer coating so that the inner wall of the tight buffer is in direct and intimate contact with the outer surface of the polymer coating; the tight buffer being primarily made from a thermoplastic elastomer material.

2. A cable as set forth in claim 1 wherein the polymer coating is a single layer made primarily of acrylate.

3. A cable as set forth in claim 1 wherein the thermoplastic elastomer material is a thermoplastic polyester elastomer.

4. A cable as set forth in claim 1 wherein the tight buffer is primarily a mixture of polyethylene and ethylene propylene diene monomer.

5. A cable as set forth in claim 1 wherein the optical fiber unit includes an aramid yarn located on a portion of the outer surface of the polymer coating of the fiber optic unit; the tight buffer being in intimate contact with the outer surface of the polymer coating and the aramid yarn whereby the aramid yarn is snugly in place between the tight buffer and the polymer coating.

6. A cable as set forth in claim 1, further including an aramid yarn located on the outer surface of the tight buffer.

7. A cable as set forth in claim 1, further including a jacket surrounding the tight buffer.

8. A cable as set forth in claim 1, further including a non-hygroscopic thixotropic filling compound received within the fiber unit.

9. A cable as set forth in claim 1, further including a plurality of optical fiber units; a tight buffer surrounding each of the optical fiber units forming a plurality of buffered optical fiber units; a jacket surrounding the plurality of buffered optical fiber units.

10. A cable as set forth in claim 9, further including a layer of aramid yarn located between the jacket and the plurality of buffered optical fiber units.

11. A cable as set forth in claim 9 wherein the plurality of buffered optical fiber units includes a first group of buffered optical fiber units and a second group of buffered optical fiber units; the cable forming an internal housing; the internal housing having a central portion and an outer portion; the first group of buffered optical fiber units located in the central portion and the second group of buffered optical fiber units located in the outer portion; a layer of aramid yarn located between the central portion and the outer portion.

12. A cable as set forth in claim 1, further including an inner jacket surrounding the tight buffer; a metal braid surrounding the inner jacket; an outer jacket surrounding the metal braid.

13. A cable as set forth in claim 12, further including an aramid layer located between the inner jacket and the tight buffer.

14. A cable as set forth in claim 1, further including an amount of gel adjacent to at least some of the optical fiber members.

15. An optical fiber cable comprising:
a plurality of optical fiber members; each optical fiber member including an optical fiber and a protective coating surrounding the optical fiber;
a polymer coating surrounding the plurality of optical fiber members forming at least one optical fiber unit; and
a thermoplastic elastomer layer surrounding the optical fiber unit forming a tight buffer; the tight buffer having an inner wall and an outer wall; the polymer coating having an outer surface; the tight buffer being extruded directly onto the outer surface of the polymer coating so that the inner wall of the tight buffer is in direct and intimate contact with the outer surface of the polymer coating; the thermoplastic elastomer material being a thermoplastic polyester elastomer or a mixture of polyethylene and ethylene propylene diene monomer.

16. A cable as set forth in claim 15 wherein the the fiber unit includes an aramid yarn located on the outer surface of the polymer coating; the tight buffer being in intimate contact with the outer surface of the polymer coating and the aramid yarn.

17. A cable as set forth in claim 15, further including a plurality of optical fiber units; a tight buffer surrounding each of the optical fiber units forming a plurality of buffered optical fiber units; a jacket surrounding each of the buffered optical fiber units.

18. A cable as set forth in claim 17 wherein the plurality of buffered optical fiber units includes a first group of buffered optical fiber units and a second group of buffered optical fiber units; the cable forming an internal housing; the internal housing having a central portion and an outer portion; the first group of buffered optical fiber units located in the central portion and the second group of buffered optical fiber units located in the outer portion; a layer of aramid yarn located between the central portion and the outer portion.

19. A cable as set forth in claim 15, further including an inner jacket surrounding a tight buffer, a metal braid surrounding the inner jacket, and an outer jacket surrounding the metal braid.

20. A cable as set forth in claim 15, wherein the polymer coating is made primarily of a single layer of acrylate.

21. An optical fiber cable comprising:
a plurality of optical fiber units; each optical fiber unit including a plurality of optical fiber members;
each optical fiber ember including an optical fiber and a protective coating surrounding the optical fiber;
each optical fiber unit including a polymer coating surrounding the plurality of optical fiber members wherein a portion of the polymer coating is located between at least some of the optical fiber members; and
a thermoplastic elastomer layer surrounding each of the optical fiber units forming tight buffers; each tight buffer having an inner wall and an outer wall; each polymer coating having an outer surface; each tight buffer being extruded directly onto the outer surface of each polymer coating so that the inner wall of each tight buffer is in direct and intimate contact with the outer wall of each polymer coating.

22. An optical fiber cable comprising:
a plurality of optical fiber members; each optical fiber member including an optical fiber and a protective coating surrounding the optical fiber;
a polymer coating surrounding the plurality of optical fiber members wherein a portion of the polymer coating is located between at least some of the optical fiber members;
the optical fiber members and the polymer coating forming an optical fiber unit; and
a tight buffer surrounding the optical fiber unit; the tight buffer having an inner wall and an outer wall; the polymer coating having an outer surface; the tight buffer being extruded directly onto the outer surface of the polymer coating so that the inner wall of the tight buffer is in direct and intimate contact with the outer surface of the polymer coating; the tight buffer being primarily made from polyvinyl chloride.

* * * * *